United States Patent Office 3,470,202
Patented Sept. 30, 1969

3,470,202
5,6-DIPHENYL-4,4α,5,6,7,8-HEXAHYDRO-2(3H)-
NAPHTHALENONES
Daniel Lednicer, Portage, Mich., assignor to The
Upjohn Company, Kalamazoo, Mich., a corporation of Delaware
No Drawing. Continuation-in-part of application Ser. No.
364,288, May 1, 1964. This application Nov. 13, 1967,
Ser. No. 682,632
Int. Cl. C07d 27/04, 29/10; C07c 97/10
U.S. Cl. 260—326.5          2 Claims

ABSTRACT OF THE DISCLOSURE

The invention is a group of organic compounds having the following formula:

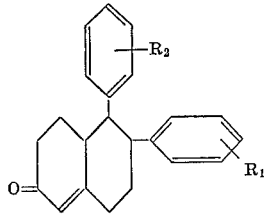

wherein $R_1$ is hydrogen, lower-alkyl, or halogen and $R_2$ is hydroxy or tertiaryaminoalkoxy. The tertiaryaminoalkoxy compounds are useful for preparing moth-proofing agents and the hydroxy compounds are intermediates for preparing the tertiaryaminoalkoxy compounds.

Cross reference to related application

This application is a continuation-in-part of my copending application Serial No. 364,288, filed May 1, 1964, now abandoned.

Description

This invention relates to novel organic compounds. In particular, this invention relates to compounds of the formula:

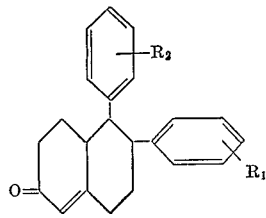

(V)

wherein $R_1$ is selected from the class consisting of hydrogen, lower-alkyl, and halogen; and wherein $R_2$ is hydroxy or the radical

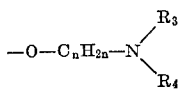

wherein $C_nH_{2n}$ is alkylene from 2 to 6 carbon atoms, inclusive, $R_3$ and $R_4$ taken individually represent lower-alkyl, and $R_3$ and $R_4$ taken together with the attached nitrogen atom represent the residue of a saturated heterocyclic radical of from 5 to 7 ring atoms.

This invention also relates to compounds of the formulas:

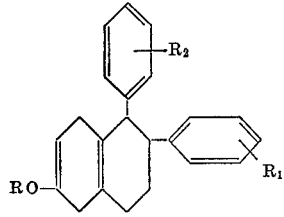

(III)

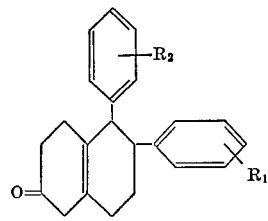

(IV)

wherein $R_1$ and $R_2$ are as defined above, and R is lower-alkyl.

The term "lower-alkyl" means an alkyl radical of from 1 to 8 carbon atoms, inclusive, such as methyl, ethyl, propyl, butyl, pentyl, heptyl, octyl, and isomeric forms thereof. The term "halogen" means fluorine, chlorine, bromine, and iodine. The term "dihydroxyalkyl from 2 to 5 carbon atoms" is inclusive of 1,2-dihydroxyethyl, 1,3-dihydroxypropyl, 2,3-dihydroxypropyl, 1,4-dihydroxybutyl, 1,3-dihydroxybutyl, 1,4-dihydroxypentyl, and the like. The term "alkylene from 2 to 6 carbon atoms, inclusive" means ethylene, propylene, butylene, pentylene, hexylene, and isomeric forms thereof. The term "heterocyclic radical of from 5 to 7 ring atoms" is inclusive of pyrrolidino, lower-alkylpyrrolidino such as 2-methylpyrrolidino, 2,2-dimethylpyrrolidino, 3-methylpyrrolidino, and the like, piperazino, lower-alkylpiperazino such as 2-methylpiperazino, 4-methylpiperazino, 2,4-dimethylpiperazino, and the like, piperidino, lower-alkylpiperidino such as 2-methylpiperidino, 3-methylpiperidino, 4,4-dimethylpiperidino, and the like, morpholino, hexamethylenimino, homopiperazino, and the like. The term "alkylene from 1 to 12 carbon atoms inclusive" means methylene, ethylene, propylene, butylene, pentylene, hexylene, heptylene, octylene, nonylene, decylene, undecylene, dodecylene, and isomeric forms thereof.

The term "novel compounds of the invention" as used throughout the specification embraces the compounds represented by the Formulae III, IV and V above, including the acid addition salts and quaternary ammonium salts of said compounds wherein the substituent $R_2$ contains a tertiary amino group.

The acid addition salts of the invention comprise the salts of the basic compounds of Formulae III, IV and V above with pharmacologically acceptable acids such as sulfuric, hydrochloric, nitric, phosphoric, lactic, benzoic, methanesulfonic, p-toluenesulfonic, salicylic, acetic, propionic, maleic, malic, tartaric, citric, cyclohexanesulfamic, succinic, nicotinic, ascorbic acids, and the like.

The quaternary ammonium salts of the invention are the salts obtained by reacting the tertiary amino compounds of Formulae III, IV and V with quaternating agents, for example, lower-alkyl halides, lower-alkenyl halides, di(lower-alkyl) sulfates, aralkyl halides, lower-alkyl arylsulfonates, and the like. The term "lower-alkyl" has the meaning hereinbefore defined. The term "lower-alkenyl" means alkenyl from 3 to 8 carbon atoms, inclusive, such as allyl, butenyl, pentyl, hexenyl, heptenyl, octenyl, and isomeric forms thereof. The term "aralkyl" means an aralkyl group containing from 7 to 13 carbon atoms, inclusive, such as benzyl, phenethyl, phenylpropyl, benzhydryl and the like. The term "lower-alkyl arylsulfonates" means the esters formed from lower-alkyl alcohols and arylsulfonic acids such as benzenesulfonic, toluenesulfonic, xylenesulfonic, and like acids. Examples of quaternary salts of the compounds of the invention are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl toluenesulfonate, ethyl toluenesulfonate, and the like.

The compounds of the invention are useful as intermediates. For example, the basic compounds having the Formulae III, IV and V can be reacted with fluosilicic acid to form the fluosilicate salts which in dilute aqueous solution are effective moth-proofing agents as more fully disclosed in U.S. Patents 2,075,359 and 1,915,334.

The novel compounds of the invention are prepared in accordance with the reactions shown in the following flow-sheet:

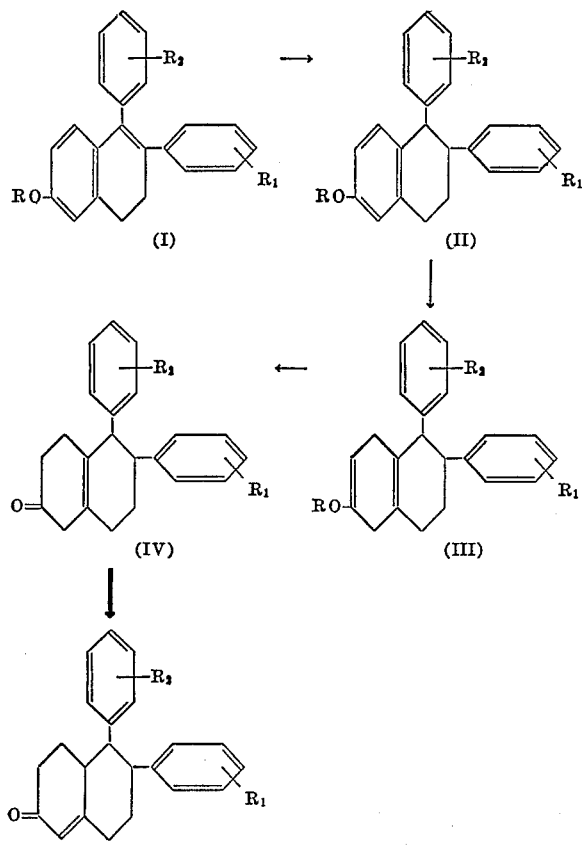

wherein R, $R_1$ and $R_2$ are as defined above.

The 1,2-diphenyl-6-alkoxy-3,4-dihydronaphthalenes (I) employed as starting materials are subjected to reduction by methods well known in the art for the saturation of ethenoid bonds to give the corresponding 1,2,3,4-tetrahydronaphthalenes (II). The reduction can be effected using reducing agents such as sodium in the presence of an alkanol, for example, methanol, ethanol, propanol, isobutyl alcohol, and the like, and lithium and like alkali metals in the presence of liquid ammonia. The use of lithium and liquid ammonia is the preferred method of effecting the reduction of (I) to (II).

Using the latter reducing agent, the reduction can be carried out by adding an approximately stoichiometric amount of lithium, advantageously in the form of lithium wire, to a solution of the dihydronaphthalene (I) in a mixture of liquid ammonia and an inert organic solvent such as tetrahydrofuran, benzene, toluene, ethanol, methanol, isobutyl alcohol, tertiary butyl alcohol, and the like, or a mixture of such solvents. The reduction occurs rapidly and is usually substantially complete in a period of from about 15 minutes to about 1 hour, though longer reaction periods may be necessary with certain compounds. The desired product (II; $R_2=X$) is isolated from the reaction mixture by conventional procedures; for example, by evaporation of the solvent after addition of ammonium chloride, followed by solvent extraction of the residue, evaporation of solvent from the extract, and purification of the resulting product by recrystallization, chromatography, or like conventional procedures.

The thus-obtained compounds of Formula II wherein $R_2$ is hydroxy can then be converted to other compounds having the Formula II wherein $R_2$ is etherified hydroxy by conventional procedures. For example, the compounds (II) ($R_2$=OH) can be alkylated by methods well known in the art for the etherification of phenols. Illustratively, the compounds of Formula II wherein $R_2$ is tertiaryaminoalkoxy

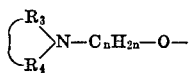

wherein $R_3$, $R_4$ and $C_nH_{2n}$ are as hereinbefore defined, can be prepared by treating the corresponding compounds of Formula II wherein $R_2$ is hydroxy with the appropriate lower-alkyl halide or tretiaryaminoalkyl halide

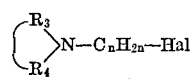

wherein $R_3$, $R_4$ and $C_nH_{2n}$ are as hereinbefore defined, and Hal is halogen, preferably bromine or iodine, in the presence of a base such as sodium hydroxide, sodium methoxide, and the like. The etherification is conducted advantageously in the presence of an inert organic solvent such as tetrahydrofuran, dioxane, a lower-alkanol, for example, methanol, ethanol, isopropyl alcohol, and the like.

The compounds IV wherein $R_2$ represents tertiaryaminoalkoxy can be prepared by direct hydrolysis of the corresponding compounds of Formula III or can be prepared by etherification of the corresponding compounds IV wherein $R_2$ is hydroxy, using the procedures described above for the preparation of the corresponding ethers of Formula II.

The compounds of the invention having the Formula V are obtained by rearrangement of the corresponding compounds of Formula IV. Said rearrangement is carried out by treating the compound IV with strong mineral acid such as concentrated hydrochloric acid, sulfuric acid, hydrobromic acid, phosphoric acid or the like, or by treatment with strong base such as sodium hydroxide, potassium hydroxide, potassium ethoxide, sodium methoxide, and the like. The reaction is advantageously carried out in concentrated aqueous or alcoholic solution at approximately the boiling point of the reaction mixture. When the rearrangement is substantially complete, as determined by infrared or like analytical techniques, the desired compound V is isolated from the reaction mixture by conventional techniques such as by neutralization folowed by evaporation to dryness and purification of the residue by conventional techniques such as solvent extraction, countercurrent distribution, chromatography, recrystallization, and the like, or any combination of these techniques.

The compounds of Formula V wherein $R_2$ represents tertiaryaminoalkoxy can be prepared by etherification of the corresponding compounds V wherein $R_2$ is hydroxy or by direct rearrangement of the corresponding etherified compounds IV. The etherification of the hydroxy group is carried out using the etherification procedures described above for the preparation of the corresponding ethers of Formula II.

The acid addition salts of the compounds of the invention, i.e., the acid addition salts of those compounds of Formulae III, IV and V which are basic, can be prepared by methods well known in the art. For example, the acid addition salts of the basic compounds of the invention can be prepared by reacting said basic compounds with a pharmacologically acceptable acid, as hereinbefore exemplified, in the presence of an inert solvent such as methanol, ethanol, diethyl ether, ethyl acetate, and the like.

The quaternary ammonium salts of the invention, i.e., the quaternary ammonium salts of the tertiary amino compounds of Formulae III, IV and V can be prepared by reacting the tertiary amino compound with a quaternating agent, for example, an alkyl halide such as methyl iodide, ethyl chloride, isopropyl bromide, and the like, an alkenyl halide such as allyl chloride, allyl bromide, and the like, a dialkyl sulfate such as dimethyl sulfate, diethyl sulfate, and the like, an aralkyl halide such as benzyl bromide, benzhydryl chloride, phenethyl bromide, and the like, or an alkyl arylsulfonate such as methyl p-toluenesulfonate, and the like. Preferably the reaction is effected by heating the reactants together in the presence of an inert solvent such as acetonitrile, acetone, methanol, ethanol, and the like. Generally speaking, the desired quaternary salt separates from solution upon cooling the reaction mixture and can be isolated by filtration. Purification of the quaternary salt can be effected by conventional methods, for example, by recrystallization.

The anion of the quaternary ammonium salt obtained as described above can be exchanged for any other desired anion, e.g., the anions of the various acids enumerated previously, by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quaternary ammonium salt.

The metal salts of the invention, namely the alkali metal and alkaline earth metal salts of the compounds of the Formulae III, IV and V wherein $R_2$ represents free hydroxy, can be prepared by conventional procedures, for example, by neutralizing the appropriate phenol with an appropriate alkali metal hydroxide, or carbonate, or an alkaline earth metal hydroxide, in aqueous or aqueous alcoholic solution followed by evaporation to dryness of the resulting solution.

The compounds having the Formula I which are employed as starting materials in the process of the invention can be prepared according to the following reaction scheme:

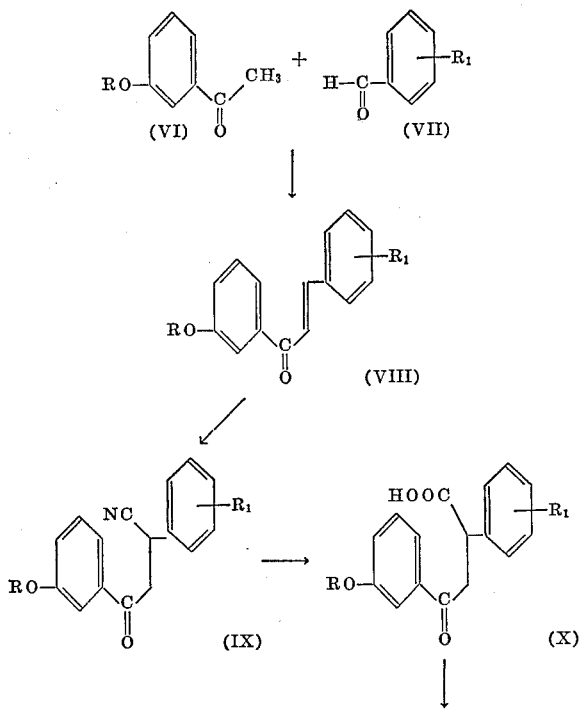

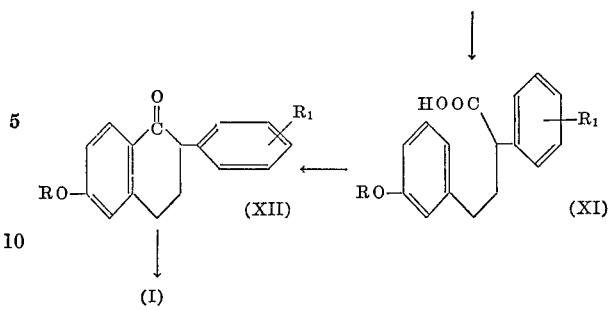

In the above formulae R and $R_1$ have the significance hereinbefore defined.

In the above reaction sequence, the appropriately substituted acetophenone (VI) is condensed with the appropriately substituted benzaldehyde (VII) to produce the corresponding chalcone (VIII) under conditions conventionally employed in the preparation of chalcones, for example, by condensation of VI and VII in the presence of a base such as sodium hydroxide, potassium hydroxide, and the like, in an inert solvent such as a mixture of water and a lower alkanol, for example, methanol, ethanol and the like. The reaction is generally conducted at or below room temperature (approximately 20 to 25° C.) with external cooling as required. The chalcone (VIII) is isolated from the reaction mixture and purified by conventional procedures, for example, by solvent extraction followed by distillation, in the case of a liquid product, or recrystallization in the case of a solid product.

The chalcone (VIII) so obtained is then converted to the corresponding nitrile (IX) by reaction with hydrogen cyanide, for example, by treatment with an alkali metal cyanide such as potassium cyanide, sodium cyanide, and the like, in the presence of acetic acid and an inert solvent such as aqueous methanol, aqueous ethanol, and the like, using the procedure described by Newman, J. Am. Chem. Soc. 60, 2947, 1938 for the conversion of benzalacetophenone (chalcone) to α-phenyl-β-benzoylpropionitrile. The desired nitrile (IX) generally separates from the reaction mixture as a solid and can be isolated by filtration and purified by recrystallization.

The nitrile (IX) so obtained is hydrolyzed to the corresponding keto acid (X) by conventional procedures for the hydrolysis of nitriles, for example, by heating under reflux in the presence of aqueous mineral acid such as sulfuric acid until hydrolysis is substantially complete. The desired acid (X) generally separates from the reaction mixture as a solid and is isolated by filtration and purified by recrystallization or by other conventional procedures, for example, by conversion to an alkali metal salt followed by acidification of the latter to regenerate the free acid.

The keto acid (X) so obtained is then subjected to reduction to form the corresponding acid (XI). The reduction can be effected using any of the methods customarily employed for the conversion of a keto group to a methylene group. A particularly suitable reducing agent is amalgamated zinc; for example, treatment of the keto acid (X) with amalgamated zinc in the presence of a mineral acid affords the desired acid (XI) in excellent yield. The acid (XI) can be isolated from the reaction mixture by conventional procedures, for example, by decantation of the liquid reaction mixture, followed by solvent extraction of the decanted liquid and evaporation of the solvent. Generally speaking, the acid (XI) so obtained is sufficiently pure to be used in the next step of the synthesis without further treatment. If desired, however, the acid (XI) so obtained can be purified by conventional procedures, for example, by distillation in the case of a liquid or recrystallization in the case of a solid, or by conversion to an alkali metal salt followed by acidification of the latter to yield the free acid.

In the next stage of the synthesis the acid (XI) is cyclized to the required α-tetralone (XII) in the presence of a Lewis acid using the general procedure described by Fieser and Hershberg, J. Amer. Chem. Soc. 61, 1272, 1939. The term "Lewis acid" is well known in the art and is defined succinctly by Fieser and Fieser, "Organic Chemistry," third edition, page 138 (Reinhold, 1956). Examples of such compounds are hydrogen fluoride, boron trifluoride, arsenic trifluoride, phosphorous pentafluoride, titanium tetrafluoride, concentrated sulfuric acid, polyphosphoric acid, and the like. The preferred Lewis acid for use in the above process is hydrogen fluoride.

A particularly convenient method of cyclizing the acid (XI) according to the above procedure comprises adding the acid (XI) to liquid hydrogen fluoride with stirring and then allowing the hydrogen fluoride to evaporate at about 20 to 30° C. The desired α-tetralone (XII) is then isolated from the residue by conventional methods, for example, by dissolving the residue in a suitable solvent such as diethyl ether, washing the solution so obtained with an aqueous solution of a base such as sodium carbonate, sodium hydroxide, and the like, and then evaporating the washed solution to dryness. The α-tetralone (XII) so obtained can be purified, if desired, by conventional procedures, for example, by recrystallization.

Alternatively, the acid (XI) can be cyclized to the α-tetralone (XII) by conversion of the acid (XI) to the corresponding acid chloride and treatment of the latter with aluminum chloride or stannic chloride according to the procedure described by Fieser et al., J. Am. Chem. Soc. 60, 170, 1938.

The α-tetralone (XII) is condensed with the appropriate Grignard reagent

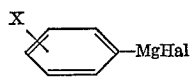

wherein X is as hereinbefore defined with the exception noted below, and Hal represents halogen, preferably bromine or iodine, to give the corresponding compound I. The reaction is carried out under conditions normally employed in conducting Grignard reactions. Thus, the reaction is carried out under anhydrous conditions, advantageously in the presence of an inert solvent such as dibutyl ether, diisopropyl ether, tetrahydrofuran, and the like. The preferred solvent is tetrahydrofuran. The reaction can be carried out at temperatures within the range of about 0° C. to about the boiling point of the solvent employed, and preferably is carried out within the range of about 15° to about 30° C.

The desired product (I) can be isolated from the reaction mixture by convention procedures. For example, the reaction mixture from the above-described Grignard reaction is decomposed by the addition of water, ammonium chloride, and the like, followed by separation of the organic layer and removal of the solvent therefrom. The residue is purified, if desired, by conventional procedures, for example, by chromatography, recrystallization, and the like.

In preparing the compounds (I) wherein X represents hydroxy from the corresponding α-tetralone (XII) it is necessary to employ a Grignard reagent in which the group X represents a protected hydroxy group from which the free hydroxy can be regenerated subsequently. A convenient manner in which this preparation can be effected is to employ a Grignard reagent formed from the tetrahydropyranyl ether of the appropriate halophenol. The reaction of such a Grignard reagent with the α-tetralone (XII) gives rise to the desired compound (I) wherein the hydroxy group is still protected as the tetrahydropyranyl ether. The ether grouping is readily removed by mineral acid hydrolysis and where the working up procedures from the Grignard reaction employs the use of mineral acid, said ether is often removed during the working up without the need to introduce a separate hydrolysis step.

The Grignard reagents employed in the conversion of the α-tetralones (XII) to the compounds (I) are prepared by reaction of magnesium in an anhydrous inert organic solvent such as dibutyl ether, diisopropyl ether, tetrahydrofuran, and the like, with the appropriately substituted halobenzene, using procedures well known in the art for the preparation of Grignard reagents.

The acetonphenones (VI) which are employed as starting materials in the above-described synthesis of the α-tetralones (XII) can be prepared from the corresponding nuclear-substituted benzoic acids by conversion of the latter to the acid chlorides followed by reaction of the latter with dimethyl cadmium according to the procedure described in Chemical Reviews 40, 15, 1947. Many of the acetophenones (VI) are known in the literature.

The benzaldehydes (VII) which are employed as starting materials in the above-described synthesis of the α-tetralones (XII) can be obtained by reduction of the corresponding substituted benzoyl chlorides using lithium tri-t-butoxyaluminum hydride using the procedure described by Brown et al., J. Amer. Chem. Soc. 80, 5377, 1958. Many of the benzaldehydes of the Formula VII are known in the literature.

An alternative method for the preparation of the α-tetralones of Formula XII is that described by Newman, J. Am. Chem. Soc. 62, 2295, 1940. The method comprises reacting the appropriately substituted benzyl cyanide

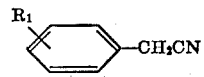

with the appropriately substituted phenethyl bromide

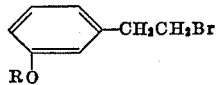

$R_1$ and R having the significance hereinbefore defined, in the presence of sodamide and hydrolyzing the resulting nitrile to give the corresponding acid (XI) which is then cyclized as hereinbefore described to the α-tetralone (XII).

The following preparations and examples illustrate the best method contemplated by the inventor for carrying out his invention.

PREPARATION 1

*3'-methoxychalcone*

A solution of 45 g. of m-methoxyacetophenone in 75 ml. of 95% ethanol was added to a cooled solution of 16 g. of sodium hydroxide in 140 ml. of water. The mixture was then placed in an ice bath and 31.8 g. of benzaldehyde was added at such a rate as to keep the temperature below 20° C. The mixture was stirred for an additional 30 minutes in the cold and was then stirred for 27 hours at about 25° C. The resulting solution was extracted with ether and the extract was washed with saturated sodium chloride solution before being percolated through anyhdrous magnesium sulfate and evaporated to dryness under reduced pressure. There was thus obtained 50.9 g. of 3'-methoxychalcone in the form of an oil having a boiling point of 180 to 185° C. at a pressure of 4 mm. of mercury.

Using the above procedure, but replacing m-methoxyacetophenone by the following compounds: m-ethoxy-, m-pentyloxy- (prepared by etherification of m-hydroxyacetophenone with pentyl bromide), m-hexyloxy- (prepared from m-hydroxyacetophenone by etherification with hexyl bromide), and m-isoöctyloxyacetophenone (prepared from m-hydroxyacetophenone by etherification with isoöctyl bromide), there are obtained 3'-ethoxy-, 3'-pentyloxy-, 3'-hexyloxy-, and 3'-isoöctyloxychalcone, respectively.

Similarly, using the procedure described in Preparation 1, but replacing benzaldehyde by the following known compounds: 2 - bromobenzaldehyde, 3 - chlorobenzaldehyde, 2-chloro-6-fluorobenzaldehyde, 2,3-dichlorobenzaldehyde, p-tolualdehyde, and 2,6-dimethylbenzaldehyde, there are obtained 2-bromo-3'-methoxychalcone, 3-chloro-3'-methoxychalcone, 2 - chloro - 6 - fluoro - 3' - methoxychalcone, 2,3-dichloro-3'-methoxychalcone, 4-methyl-3'-methoxychalcone and 2,6-dimethyl-3'-methoxychalcone, respectively.

PREPARATION 2

2-phenyl-4-(3-methoxyphenyl)-4-ketobutyronitrile

A solution of 27.8 g. of potassium cyanide in 50 ml. of water was added to a mixture of 50.9 g. of 3'-methoxychalcone, 13.0 g. of acetic acid, and 100 ml. of 95% ethanol over a period of 10 minutes. The temperature was maintained at 45° C. The turbid mixture was then stirred for 6 hours and allowed to stand overnight in the cold. The crystalline solid which had separated was isolated by filtration, washed with ice-cold aqueous ethanol and with water, and recrystallized from ethanol. There was thus obtained 49.22 g. of 2-phenyl-4-(3-methoxyphenyl)-4-ketobutyronitrile in the form of a crystalline solid having a melting point of 96 to 101° C. The infrared spectrum of the compound (mineral oil mull) exhibited maxima at 2200, 1660, and 1580 reciprocal centimeters.

Using the above procedure, but replacing 3'-methoxychalcone by 3'-ethoxy-, 3'-pentyloxy-, 3'-hexyloxy-, 3'-isoöctyloxy-, 2-bromo-3'-methoxy-, 3-chloro-3'-methoxy-, 2 - chloro - 6 - fluoro - 3' - methoxy -, 2,3 - dichloro - 3' - methoxy-, 4-methyl-3'-methoxy-, and 2,6-dimethyl-3'-methoxychalcone, there are obtained 2-phenyl-4-(3-ethoxyphenyl)-4-ketobutyronitrile, 2-phenyl-4-(3-pentyloxyphenyl)-4-ketobutyronitrile, 2-phenyl-4-(3-hexyloxyphenyl) - 4 - ketobutyronitrile, 2 - phenyl - 4 - (3 - isoöctyloxyphenyl)-4-ketobutyronitrile, 2-(2-bromophenyl)-4 - (3-methoxyphenyl) - 4 - ketobutyronitrile, 2 - (3 - chlorophenyl) - 4 - (3 - methoxyphenyl) - 4 - ketobutyronitrile, 2 - (2 - chloro - 6 - fluorophenyl) - 4 - (3 - methoxyphenyl) - 4 - ketobutyronitrile, 2 - (2,3 - dihcolorophenyl) - 4 - (3 - methoxyphenyl) - 4 - ketobutyronitrile, 2-p-tolyl-4-(3-methoxyphenyl)-4-ketobutyronitrile, and 2-(2,6 - dimethylphenyl) - 4 - (3 - methoxyphenyl) - 4 - ketobutyronitrile, respectively.

PREPARATION 3

2-phenyl-4-(3-methoxyphenyl)-4-ketobutyric acid

A suspension of 49.22 g. of 2-phenyl-4-(3-methoxyphenyl)-4-ketobutyronitrile in a mixture of 140 ml. of concentrated sulfuric acid and 125 ml. of water was heated on a steam bath with vigorous stirring for 4 hours. The resulting mixture was cooled and diluted with ice water. The solid which separated was isolated by filtration and recrystallized from aqueous ethanol and then from benzene. There was thus obtained 29.5 g. of 2-phenyl-4-(3-methoxyphenyl)-4-ketobutyric acid in the form of a crystalline solid having a melting point of 140 to 145° C. An analytical sample having a melting point of 143 to 145° C. was obtained by recrystallization from benzene.

*Analysis.*—Calcd. for $C_{17}H_{16}O_4$: C, 71.82; H, 5.67. Found: C, 72.10; H, 5.74.

Using the above procedure, but replacing 2-phenyl-4-(3-methoxyphenyl)-4-ketobutyronitrile by the appropriately substituted 2,4-diphenyl-4-ketobutyronitrile (prepared as described in Preparation 2), there are obtained 2-phenyl-4-(3-ethoxyphenyl)-4-ketobutyric acid, 2-phenyl-4-(3-pentyloxyphenyl)-4-ketobutyric acid, 2-phenyl-4-(3-hexyloxyphenyl)-4-ketobutyric acid, 2-phenyl-4-(3-isoöctyloxyphenyl)-4-ketobutyric acid, 2-(2-bromophenyl)-4 - (3 - methoxyphenyl) - 4 - ketobutyric acid, 2 - (3 - chlorophenyl) - 4 - (3 - methoxyphenyl) - 4 - ketobutyric acid, 2 - (2 - chloro - 6 - fluorophenyl) - 4 - (3 - methoxyphenyl)-4-ketobutyric acid, 2-(2,3-dichlorophenyl)-4-(3-methoxyphenyl) - 4 - ketobutyric acid, 2 - p - tolyl - 4 - (3-methoxyphenyl)-4-ketobutyric acid and 2-(2,6-dimethylphenyl)-4-(3-methoxyphenyl)-4-ketobutyric acid, respectively.

PREPARATION 4

2-phenyl-4-(3-methoxyphenyl)butyric acid

A total of 300 g. of mossy zinc was washed briefly with 2.5 N hydrochloric acid and then with water. The metal was covered with a solution of 6.7 g. of mercuric chloride in 500 ml. of water, and this mixture was allowed to stand for 30 minutes with occasional shaking. The liquid phase was decanted and the amalgamated metal was washed well with water. To the amalgamated zinc so produced was added a mixture of 29.3 g. of 2-phenyl-4-(3-methoxyphenyl)-4-ketobutyric acid and 400 ml. of hydrochloric acid. The mixture was heated cautiously to reflux temperature and then heated under reflux for a total of 20 hours, additional portions of hydrochloric acid being added after 5 hours and 10 hours of heating. The resulting mixture was cooled and the liquid was decanted from the solid. The solid residue was washed well with ether and the decanted liquid was extracted with ether. The ether extract and washings were combined and washed with water and then with saturated sodium chloride solution before being percolated through anhydrous magnesium sulfate. The percolate was evaporated to dryness. There was thus obtained 26.2 g. of 2-phenyl-4-(3-methoxyphenyl)butyric acid in the form of a viscous oil which was employed without further purification in the process of Preparation 5. The infrared spectrum of the compound (mineral oil mull) exhibited a maximum at 1705 reciprocal centimeters.

Using the above procedure, but replacing the 2-phenyl-4-(3-methoxyphenyl)-4-ketobutyric acid by the appropriately substituted 2,4-diphenyl-4-ketobutyric acid (prepared as described in Preparation 3), there are obtained 2 - phenyl - 4 - (3 - ethoxyphenyl) - , 2 - phenyl - 4 - (3 - pentyloxyphenyl) -, 2 - phenyl - 4 - (3 - hexyloxyphenyl) -, 2 - phenyl - 4 - (3 - isoöctyloxyphenyl) -, 2 - (2 - bromophenyl) - 4 - (3 - methoxyphenyl) -, 2 - (3 - chlorophenyl) - 4 - (3 - methoxyphenyl) -, 2 - (2 - chloro - 6 - fluorophenyl) - 4 - (3 - methoxyphenyl) -, 2 - (2,3 - dichlorophenyl) - 4 - (3 - methoxyphenyl) -, 2-p-tolyl-4-(3-methoxyphenyl)-, and 2-(2,6-dimethylphenyl)-4-(3-methoxyphenyl)-butyric acids, respectively.

PREPARATION 5

2-phenyl-6-methoxy-1,2,3,4-tetrahydro-1-naphthalenone

A total of 150 ml. of liquid hydrogen fluoride was added to 26.2 g. of 2-phenyl-4-(3-methoxyphenyl)butyric acid with cooling and swirling. The resulting mixture was allowed to stand at room temperature for 3 days. The residue was dissolved in methylene chloride and the solution was poured into excess concentrated aqueous potassium carbonate solution. The organic layer was separated, washed with water and saturated sodium chloride solution, and then evaporated to dryness. The residue was dissolved in 2 l. of mixed hexanes (Skellysolve B) containing 7.5% by volume of acetone and the solution was passed through a column of magnesium silicate (Florisil) prewashed with the same solvent mixture. The eluate was evaporated to dryness and the residue (17.0 g.) was recrystallized twice from cyclohexane. There was thus obtained 13.38 g. of 2-phenyl-6-methoxy-1,2,3,4-tetrahydro-1-naphthalenone in the form of a crystalline solid having a melting point of 113 to 116° C.

*Analysis.*—Calcd. for $C_{17}H_{16}O_2$: C, 80.92; H, 6.39. Found: C, 81.08; H, 6.35.

Using the above procedure, but replacing 2-phenyl-4-(3-methoxyphenyl)butyric acid by the appropriately substituted 2,4-diphenylbutyric acid (prepared as described in Preparation 4), there are obtained 2-phenyl-6-ethoxy-, 2-phenyl-6-pentyloxy-, 2-phenyl-6-hexyloxy-, 2-phenyl-6- isoöctyloxy-, 2 - (2 - bromophenyl) - 6-methoxy-, 2-(3-chlorophenyl) - 6-methoxy-, 2-(2-chloro-6-fluorophenyl)-6 - methoxy -, 2 - (2,3-dichlorophenyl)-6-methoxy-, 2-p-tolyl - 6 - methoxy-, and 2 - (2,6 - dimethylphenyl)-6-methoxy - 1,2,3,4 - tetrahydro-1-naphthalenones, respectively.

PREPARATION 6

1,2-diphenyl-6-methoxy-3,4-dihydronaphthalene

A solution of 5.04 g. (0.02 mole) of 2-phenyl-6-methoxy-1,2,3,4-tetrahydro-1-naphthalenone in 75 ml. of tetrahydrofuran was added to an ice-cooled solution of the Grignard reagent prepared from 31.4 g. (21 ml.) of bromobenzene and 0.90 g. of magnesium in 200 ml. of ether. The resulting mixture was allowed to stand at room temperature (approximately 20° C.) for 16 hours before being decomposed by the careful addition of water. The mixture so obtained was filtered and the organic filtrate was washed with water and with saturated sodium chloride solution before being dried over anhydrous sodium sulfate. The dried solution was filtered and the filtrate was evaporated to dryness. The residual gum was dissolved in methylene chloride and chromatographed twice over magnesium silicate (Florisil). The columns were eluted with petroleum ether containing increasing proportions of acetone and those fractions which, on the basis of paper chromatographic analysis, were found to contain the desired product were combined and evaporated to dryness. The fractions so obtained from the second chromatography were recrystallized from aqueous methanol. There was thus obtained 2.5 g. of 1,2 - diphenyl-6-methoxy-1,2,3,4-tetrahydro-1-naphthol in the form of a crystalline solid having a melting point of 112 to 116° C. An analytical sample having a melting point of 113 to 116° C. was obtained by further recrystallization from petroleum ether.

*Analysis.*—Calcd. for $C_{23}H_{22}O_2$: C, 82.98; H, 6.96. Found: C, 83.60; H, 6.93.

A solution of 1 g. of 1,2-diphenyl-6-methoxy-1,2,3,4-tetrahydro-1-naphthol (prepared as described above) and 0.1 g. of p-toluenesulfonic acid in 100 ml. of toluene was heated for 5 hours at reflux under a Dean-Starke water trap. The solvent was then distilled from the reaction mixture and the residue was dissolved in ether. The ethereal solution was washed with saturated aqueous sodium bicarbonate solution, then with water, and finally with saturated sodium chloride solution. The washed ether solution was evaporated to dryness and the residue was recrystallized twice from Skellysolve B. There was thus obtained 0.52 g. of 1,2-diphenyl-6-methoxy-3,4-dihydronaphthalene in the form of a crystalline solid having a melting point of 90 to 92° C.

*Analysis.*—Calcd. for $C_{23}H_{20}O$: C, 88.42; H, 6.45. Found: C, 87.99; H, 6.78.

Using the above procedure but replacing 2-phenyl-6-methoxy-1,2,3,4-tetrahydro-1-naphthalenone by 2-phenyl-6-ethoxy-,
2-phenyl-6-pentyloxy-,
2-phenyl-6-hexyloxy-,
2-phenyl-6-isoöctyloxy-,
2-(2-bromophenyl)-6-methoxy-,
2-(3-chlorophenyl)-6-methoxy-,
2-(2-chloro-6-fluorophenyl)-6-methoxy-,
2-(2,3-dichlorophenyl)-6-methoxy-,
2-(p-tolyl)-6-methoxy-, and
2-(2,6-dimethylphenyl)-6-methoxy-1,2,3,4-tetrahydro-1-naphthalenone, there are obtained 1,2-diphenyl-6-ethoxy-,
1,2-diphenyl-6-pentyloxy-,
1,2-diphenyl-6-hexyloxy-,
1,2-diphenyl-6-isoöctyloxy-,
1-phenyl-2-(2-bromophenyl)-6-methoxy-,
1-phenyl-2-(3-chlorophenyl)-6-methoxy-,
1-phenyl-2-(2-chloro-6-fluorophenyl)-6-methoxy-,
1-phenyl-2-(2,3-dichlorophenyl)-6-methoxy-,
1-phenyl-2-(p-tolyl)-6-methoxy-, and
1-phenyl-2-(2,6-dimethylphenyl)-6-methoxy-3,4-dihydronaphthalene, respectively.

PREPARATION 7

1-(p-hydroxyphenyl)-2-phenyl-6-methoxy-3,4-dihydronaphthalene

A solution of 5.83 g. of 2 - phenyl - 6 - methoxy-1,2,3,4 - tetrahydro - 1 - naphthalenone in 75 ml. of tetrahydrofuran was added to a tetrahydrofuran solution containing 0.0247 mole of the Grignard reagent prepared from p-bromophenyl tetrahydropyranyl ether (Parham et al., J. Am. Chem. Soc. 70, 4187, 1948). The resulting mixture was heated under reflux for 16 hours. At the end of this time the mixture was cooled and 10 ml. of water was added. The resulting mixture was filtered and the filtrate was diluted with ether. The organic layer was separated, washed well with water, and dried over anhydrous sodium sulfate. The dried solution was filtered and the filtrate was evaporated to dryness under reduced pressure. The residue was dissolved in 100 ml. of tetrahydrofuran and again treated with the Grignard reagent as described above. The reaction mixture from the second Grignard reaction was worked up exactly as described for the first reaction mixture. The gum so obtained was dissolved in 200 ml. of benzene containing 200 mg. of p-toluenesulfonic acid and the mixture was heated under reflux under a Dean-Starke water trap until no further water was collected in the trap. The solvent was removed from the solution by distillation under reduced pressure and the residue was dissolved in a mixture of 200 ml. of acetone and 70 ml. of 0.5 N hydrochloric acid. The solution so obtained was allowed to stand for 2 hours at room temperature (about 25° C.) and then extracted with ether. The organic layer was separated and extracted with 5% aqueous potassium hydroxide solution. The aqueous alkaline extract was acidified by the addition of hydrochloric acid and the solid which separated was isolated by filtration and dried. The material so obtained was dissolved in methylene chloride and chromatographed on a column of Florisil (magnesium silicate). The column was eluted with Skellysolve B containing increasing proportions of acetone and those fractions which, on the basis of infrared and papergram analysis, were found to contain the desired compound were combined and evaporated to dryness. The residue was recrystallized twice from cyclohexane. There was thus obtained 0.71 g. of 1-(p-hydroxyphenyl) - 2 - phenyl - 6-methoxy-3,4-dihydronaphthalene in the form of a crystalline solid having a melting point of 130 to 131.5° C.

*Analysis.*—Calcd. for $C_{23}H_{20}O_2$: C, 84.12; H, 6.14. Found: C, 83.64; H, 5.96.

Using the procedure described above but replacing 2-phenyl-6-methoxy-1,2,3,4-tetrahydro-1-naphthalenone by 2-phenyl-6-ethoxy-,
2-phenyl-6-pentyloxy-,
2-phenyl-6-hexyloxy-,
2-phenyl-6-isoöctyloxy-,
2-(2-bromophenyl)-6-methoxy-,
2-(3-chlorophenyl)-6-methoxy-,
2-(2-chloro-6-fluorophenyl)-6-methoxy-,
2-(2,3-dichlorophenyl)-6-methoxy-,
2-(p-tolyl)-6-methoxy-, and
2-(2,3-dimethylphenyl)-6-methoxy-1,2,3,4-tetrahydro-1-naphthalenone, there are obtained 1-(p-hydroxyphenyl)-2-phenyl-6-ethoxy-,
1-(p-hydroxyphenyl)-2-phenyl-6-pentyloxy-,
1-(p-hydroxyphenyl)-2-phenyl-6-hexyloxy-,
1-(p-hydroxyphenyl)-2-phenyl-6-isoöctyloxy-,
1-(p-hydroxyphenyl)-2-(2-bromophenyl)-6-methoxy-,
1-(p-hydroxyphenyl)-2-(3-chlorophenyl)-6-methoxy-, 1-(p-hydroxyphenyl)-2-(2-chloro-6-fluorophenyl)-
   6-methoxy-,
1-(p-hydroxyphenyl)-2-(2,3-dichlorophenyl)-
   6-methoxy-,
1-(p-hydroxyphenyl)-2-(p-tolyl)-6-methoxy-, and
1-(p-hydroxyphenyl)-2-(2,6-dimethylphenyl)-6-
   methoxy-3,4-dihydronaphthalene, respectively.

The corresponding 1-(o-hydroxyphenyl)- and 1-(m-hydroxyphenyl) - 2 - substituted - 6-substituted-3,4-dihydronaphthalenes are obtained by employing o-bromophenyl tetrahydropyranyl ether and m-bromophenyl tetrahydropyranyl ether, respectively, in place of p-bromophenyl tetrahydropyranyl ether in the procedure of Preparation 7.

PREPARATION 8

1-(p-fluorophenyl)-2-phenyl-6-methoxy-3,4-dihydronaphthalene

Using the procedure described in Preparation 6, but replacing bromobenzene by p-bromofluorobenzene, there was obtained 1 - (p - fluorophenyl)-2-phenyl-6-methoxy-3,4-dihydronaphthalene in the form of a crystalline solid having a melting point of 99 to 101° C.

Similarly other 1-(halophenyl)-2-phenyl-6-alkoxy-3,4-dihydronaphthalenes are obtained by reacting the appropriate halophenylmagnesium halide with the appropriate 2 - phenyl - 6-alkoxy-1,2,3,4-tetrahydro-1-naphthalenone using the procedure described in Preparation 6.

PREPARATION 9

1-(p-tolyl)-2-phenyl-6-methoxy-3,4-dihydronaphthalene

Using the procedure described in Preparation 6, but replacing bromobenzene by p-bromotoluene, there was obtained 1 - (p - tolyl)-2-phenyl-6-methoxy-3,4-dihydronaphthalene in the form of a crystalline solid having a melting point of 100 to 103° C.

Similarly, other 1 - (alkylphenyl) - 2-phenyl-6-alkoxy-3,4-dihydronaphthalenes are obtained by reacting the appropriate alkylphenylmagnesium halide with the appropriate 2 - phenyl-6-alkoxy-1,2,3,4-tetrahydro-1-naphthalenone using the procedure described in Preparation 6.

EXAMPLE 1

1,2-diphenyl-6-methoxy-1,2,3,4-tetrahydronaphthalene

A solution of 0.63 g. of 1,2-diphenyl-6-methoxy-3,4-dihydronaphthalene in 20 ml. of tetrahydrofuran and 1 ml. of tert.butyl alcohol was added to 100 ml. of ammonia redistilled from lithium. To this there was added 28 mg. of lithium wire; the color faded very quickly. After 5 to 10 minutes an additional 28 mg. of lithium were added. The blue color this time prevailed for 20 minutes. After the addition of 1 g. of solid ammonium chloride, the mixture was taken to dryness under a stream of nitrogen. The residue was then washed with ether and methylene chloride. The solid which remained when the extracts were taken to dryness was recrystallized from ethanol. There was thus obtained 0.53 g. of 1,2-diphenyl-6 - methoxy-1,2,3,4-tetrahydronaphthalene having a melting point of 160 to 162° C.

One further crystallization from the same solvent gave an analytical sample, M.P. 166 to 168° C.

*Analysis.*—Calcd. for $C_{23}H_{22}O$: C, 87.86; H, 7.05. Found: C, 87.30; H, 7.13.

EXAMPLE 2

1-(p-hydroxyphenyl)-2-phenyl-6-methoxy-1,2,3,4-tetrahydronaphthalene

One gram of 1 - (p - hydroxyphenyl) - 2 - phenyl - 6 - methoxy-3,4-dihydronaphthalene was reduced by means of 84 mg. of lithium in exactly the same manner as described in Example 1. The gummy solid which remained when the solvents had been removed from the reaction mixture was suspended in water and the suspension was acidified with acetic acid. The solid was collected on a filter and recrystallized twice from methanol to yield 0.40 g. of 1-(p-hydroxyphenyl)-2-phenyl-6-methoxy-1,2,3,4-tetrahydronaphthalene, having a melting point of 188 to 190° C.

*Analysis.*—Calcd. for $C_{23}H_{22}O_2$: C, 83.60; H, 6.71. Found: C, 83.45; H, 6.89.

EXAMPLE 3

1-[p-(2 - pyrrolidinoethoxy)phenyl]-2-phenyl-6-methoxy-1,2,3,4-tetrahydronaphthalene and the hydrochloride thereof To a solution of 2.0 g. of 1-(p-hydroxyphenyl)-2-phenyl-6-methoxy-1,2,3,4-tetrahydronaphthalene in 10 ml. of dimethylformamide and 50 ml. of benzene there was added 275 mg. of sodium hydride (53% in mineral oil). When effervescence had ceased (10 minutes), 1.65 g. of a 1:1 mixture of 2-pyrrolidinoethyl chloride and toluene was added to the solution. The mixture was heated under reflux for 17 hours, allowed to cool and diluted with ether. This mixture was washed with water and saturated sodium chloride solution and the organic layer was taken to dryness. The residue was dissolved in ether and this solution was extracted with five 50-ml. portions of 2.5 N hydrochloric acid. The acid extracts were in turn extracted with methylene chloride. The solid which remained when the methylene chloride extract was taken to dryness was recrystallized twice from a mixture of methylene chloride and ethyl acetate. There was thus obtained 2.23 g. of 1-[p-(2-pyrrolidinoethoxy)phenyl]-2-phenyl-6-methoxy-1,2,3,4-tetrahydronaphthalene hydrochloride in the form of a crystalline solid having a melting point of 211 to 213° C.

*Analysis.*—Calcd. for $C_{29}H_{34}ClNO_2$: C, 75.06; H, 7.39; Cl, 7.64. Found: C, 74.83; H, 7.61; Cl, 7.72.

1 g. of the hydrochloride so obtained is dissolved in methylene chloride and the solution so obtained is washed with aqueous sodium bicarbonate solution. The washed methylene chloride solution is evaporated to dryness to yield 1-[p-(2 - pyrrolidinoethoxy)phenyl]-2-phenyl-6-methoxy-1,2,3,4-tetrahydronapthalene.

Using the above procedure but replacing 2-pyrrolidinoethyl chloride by 2-diethylaminoethyl chloride,
3-dimethylaminopropyl chloride,
3-diethylaminobutyl chloride,
5-dimethylaminopentyl bromide,
6-dimethylaminohexyl chloride,
3-(2,2-dimethylpyrrolidino)propyl bromide,
2-piperidinoethyl chloride,
2-morpholinobutyl bromide,
1-methyl-4-(2-chloroethyl)piperazine,
2-hexamethyleniminoethyl chloride,
2-homopiperazinoethyl chloride and
2-homomorpholinoethyl chloride, there are obtained 1-p-(2-diethylaminoethoxy)phenyl-,
1-p-(3-dimethylaminopropoxy)phenyl-,
1-p-(3-diethylaminobutoxy)phenyl-,
1-p-(5-dimethylaminopentyloxy)phenyl-,
1-p-(6-dimethylaminohexyloxy)phenyl-,
1-{p-[3-(2,2-dimethylpyrrolidino)propoxy]phenyl}-,
1-[p-(2-piperidinoethoxy)phenyl]-,
1-[p-(2-morpholinobutoxy)phenyl]-,
1-{p-[2-(1-methyl-4-piperazino)ethoxy]phenyl}-,
1-[p-(2-hexamethyleniminoethoxy)phenyl]-,
1-[p-(2-homopiperazinoethoxy)phenyl]- and
1-[p-(2-homomorpholinoethoxy)phenyl]-2-phenyl-6-
   methoxy-1,2,3,4-tetrahydronaphthalene and the hydrochlorides thereof.

EXAMPLE 4

*Ethyl 2-[p-(6-methoxy-2-phenyl-1,2,3,4-tetrahydro-1-naphthyl)phenoxy]-2-methylpropionate*

To a solution of 2.5 g. of 1-(p-hydroxyphenyl)-6-methoxy-2-phenyl-1,2,3,4-tetrahydronaphthalene in 13 ml. of dimethylformamide and 65 ml. of benzene, is added with stirring 0.35 g. of sodium hydride as a 53% suspension in mineral oil. When the effervescence has subsided the solution is treated with a solution of 1.5 g. of ethyl 2-bromo-2-methylpropionate in 15 ml. of benzene and the mixture is heated under reflux for 17 hours. The resulting mixture is allowed to cool, washed with water and with saturated sodium chloride solution, and the organic layer is evaporated to dryness. The residue is chromatographed on a column of magnesium silicate (Florisil) and the column is eluted with petroleum ether containing increasing proportions of acetone. Those fractions which, on the basis of infrared absorption analysis are found to contain the desired product, are combined and evaporated to dryness. The residue is recrystallized from petroleum ether to yield ethyl 2-[p-(6-methoxy-2-phenyl-1,2,3,4-tetrahydro - 1 - naphthyl)phenoxy]-2-methylpropionate in the form of a crystalline solid.

Similarly, using the above procedure but replacing ethyl 2-bromo-2-methylpropionate by ethyl bromoacetate, ethyl 5-bromovalerate and methyl 9-bromocaprate, there are obtained ethyl p-(6-methoxy-2-phenyl-1,2,3,4-tetrahydro-1-naphthyl)phenoxyacetate, ethyl 5 - [p - (6-methoxy-2-phenyl - 1,2,3,4 - tetrahydro-1-naphthyl)phenoxy]valerate and methyl 9-[p-(6-methoxy-2-phenyl-1,2,3,4-tetrahydro-1-naphthyl)phenoxy]caprate, respectively.

EXAMPLE 5

*2-[p-(6-methoxy-2-phenyl-1,2,3,4-tetrahydro-1-naphthyl)phenoxy]-2-methylpropionic acid*

A solution of 1.42 g. of ethyl 2-[p-(6-methoxy-2-phenyl - 1,2,3,4 - tetrahydro - 1 - naphthyl)phenoxy]-2-methylpropionate (prepared as described in Example 4) and 3 ml. of 50% aqueous potassium hydroxide in 50 ml. of methanol is heated under reflux for 5 hours. The reaction mixture is then evaporated to dryness and the residue is suspended in water and made strongly acid by the addition of 2.5 N hydrochloric acid. The solid which separates is isolated by filtration and recrystallized twice from aqueous methanol. There is thus obtained 2-[p-(6-methoxy - 2 - phenyl - 1,2,3,4 - tetrahydro - 1 - naphthyl) phenoxy]-2-methylpropionic acid in the form of a crystalline solid.

Using the same procedure, p-(6-methoxy-2-phenyl-1,2,3,4-tetrahydro-1-naphthyl)phenoxyacetic acid, 5-[p-(6-methoxy - 2 - phenyl - 1,2,3,4 - tetrahydro - 1 - naphthyl) phenoxy]valeric acid, and 9-[p-(6 - methoxy-2-phenyl-1,2,3,4-tetrahydro-1-naphthyl)phenoxy]capric acid, respectively, are obtained from the corresponding ethyl and methyl esters (prepared as described in Example 4).

EXAMPLE 6

*1-[p-(2,3-dihydroxypropoxy)phenyl]-2-phenyl-6-methoxy-1,2,3,4-tetrahydronaphthalene*

To a suspension of 2.97 g. of 1-(p-hydroxyphenyl)-2-phenyl-6-methoxy-1,2,3,4-tetrahydronaphthalene in 50 ml. of methanol is added 2.1 ml. of 4.55 N sodium methoxide in methanol. When the solid has all dissolved, 1.0 g. of 3-chloro-1,2-propanediol is added to the mixture and the latter is then heated for 20 hours under reflux. The resulting mixture is evaporated to dryness under reduced pressure and the residue is dissolved in a mixture of ether and water. The organic layer is separated, washed successively with aqueous sodium hydroxide solution, water, and saturated sodium chloride solution, before being evaporated to dryness. The residue is chromatographed on a column of magnesium silicate (Florisil) and the column is eluted with petroleum ether containing increasing proportions of acetone. Those fractions which, on the basis of infrared and papergram analyses, are found to contain the desired material are combined and evaporated to dryness. The residue is recrystallized from aqueous methanol to obtain 1-[p-(2,3-dihydroxypropoxy) phenyl]-2-phenyl - 6 - methoxy-1,2,3,4-tetrahydronaphthalene.

Using the above procedure, but replacing 3-chloro-1,2-propanediol by 1-chloro-2,3-butanediol and 5-bromo-1,3-pentanediol, there are obtained 1-[p-(2,3-dihydroxybutoxy)phenyl]- and 1-[p-(3,5 - dihydroxypentyloxy)phenyl]-2-phenyl-6-methoxy - 1,2,3,4 - tetrahydronaphthalene, respectively.

EXAMPLE 7

*1-[p-(2,3-epoxypropoxy)phenyl]-2-phenyl-6-methoxy-1,2,3,4-tetrahydronaphthalene*

Using the procedure described in Example 4, but replacing ethyl 2-bromo-2-methylpropionate by epichlorohydrin, there is obtained 1-[p-2,3-epoxypropoxy)phenyl]-2-phenyl-6-methoxy-1,2,3,4-tetrahydronaphthalene.

Similarly, using the procedure of Example 4, but replacing ethyl 2-bromo-2-methylpropionate by 3-bromo-1,2-epoxybutane (Chemical Abstracts 36, 404, 1942) and 5-bromo-1,2-epoxypentane (Wilson, J. Chem. Soc. 1945, 48), there are obtained 1-[p-(2,3-epoxy-1-methylpropoxy) phenyl]- and 1-[p-(4,5-epoxypentyloxy)phenyl]-2-phenyl-6-methoxy-1,2,3,4-tetrahydronaphthalene, respectively.

EXAMPLE 8

*1-[p-(3-amino - 2 - hydroxypropoxy)phenyl]-2-phenyl-6-methoxy-1,2,3,4-tetrahydronaphthalene and the hydrochloride thereof*

A mixture of 3.0 g. of 1-[p-(2,3-epoxypropoxy)phenyl]-2-phenyl-6-methoxy-1,2,3,4-tetrahydronaphthalene, 0.80 g. of succinimide and 4 drops of piperidine in 100 ml. of absolute ethanol is heated under reflux for 17 hours. The resulting mixture is concentrated to approximately one-third volume by distillation under reduced pressure and the residue is diluted with water. The mixture so obtained is extracted with methylene chloride and the methylene chloride extract is washed with water and saturated sodium chloride solution before being evaporated to dryness. The residue is recrystallized from aqueous alcohol to yield 1 - [p - (3 - succinimido - 2 - hydroxypropoxy)phenyl]-2-phenyl - 6 - methoxy-1,2,3,4-tetrahydronaphthalene. The latter compound is then heated under reflux for 20 hours with a solution of 16 g. of sodium hydroxide in 320 ml. of ethanol. The resulting product is concentrated by distillation under reduced pressure and the residue is extracted with a mixture of methylene chloride and water. The methylene chloride solution is separated, washed with water, and then shaken with 100 ml. of 2.5 N hydrochloric acid. The solid which separates is isolated by filtration, washed with methylene chloride, and dried. There is thus obtained 1-[p-(3-amino-2-hydroxypropoxy)phenyl]-2-phenyl-6-methoxy-1,2,3,4-tetrahydronaphthalene hydrochloride. The corresponding free base is obtained by dissolving the hydrochloride in methylene chloride, washing the resulting solution with aqueous sodium bicarbonate solution, and evaporating the methylene chloride solution to dryness.

Using the above procedure, but replacing 1-[p-(2,3-epoxypropoxy)phenyl]-2-phenyl - 6 - methoxy - 1,2,3,4-tetrahydronaphthalene by 1-[p-(2,3-epoxy-1-methylpropoxy)phenyl]- and 1-[p-(4,5-epoxypentyloxy)phenyl]-2-phenyl-6-methoxy-1,2,3,4-tetrahydronaphthalene, there are obtained 1-[p-(3-amino-2-hydroxy - 1 - methylpropoxy) phenyl]- and 1-[p-(5-amino-4-hydroxypentyloxy)phenyl]-2-phenyl-6-methoxy - 1,2,3,4 - tetrahydronaphthalene, respectively, and the hydrochlorides thereof.

EXAMPLE 9

*5-{[p-(6-methoxy-2-phenyl-1,2,3,4-tetrahydro-1-naphthyl) phenoxy]methyl}-2-oxazolidinethione*

A solution of 2.8 g. of 1-[p-(3-amino-2-hydroxypoxy)phenyl]-2-phenyl - 6 - methoxy-1,2,3,4-tetrahydronaphthalene in 100 ml. of ethanol is mixed with 0.85 ml. of carbon disulfide and 3.1 ml. of 25% aqueous potassium hydroxide solution. The resulting mixture is heated under reflux for 4 hours and then concentrated under reduced pressure. The concentrate is suspended in water and the suspension acidified with 2.5 N hydrochloric acid. The suspension is extracted with hot methylene chloride and the methylene chloride extract is evaporated to dryness. There is thus obtained 5-{[p-(6-methoxy-2-phenyl-1,2,3,4-tetrahydro - 1 - naphthyl)phenoxy]methyl}-2-oxazolidinethione.

Using the above procedure but replacing 1-[p-(3-amino-2-hydroxypropoxy)phenyl]-2-phenyl-6-methoxy - 1,2,3,4-tetrahydronaphthalene by 1-[p-(2,3 - epoxy-1-methylpropoxy)phenyl]- and 1-[p-(4,5-epoxypentyloxy)phenyl]-2-phenyl - 6 - methoxy-1,2,3,4-tetrahydronaphthalene, there are obtained 5-{1-[p-(6-methoxy-2-phenyl-1,2,3,4-tetrahydro-1-naphthyl)phenoxy]ethyl}- and 5-{3-[p-(6-methoxy-2-phenyl - 1,2,3,4 - tetrahydro-1-naphthyl)phenoxy] - propyl}-2-oxazolidinethione, respectively.

EXAMPLE 10

*5-{[p-(6-methoxy-2-phenyl-1,2,3,4-tetrahydro-1-naphthyl) phenoxy]methyl}-2-oxazolidinone*

To a vigorously stirred suspension of 3.7 g. of 1-[p-(3-amino - 2 - hydroxypropoxy)phenyl]-2-phenyl-6-methoxy-1,2,3,4-tetrahydronaphthalene in 30 ml. of toluene and 30 ml. of 12.5% aqueous potassium hydroxide solution is added dropwise over a short period 3.2 g. of phosgene in 10 ml. of toluene. The solid which separates is isolated by filtration and dissolved in methylene chloride. The methylene chloride solution is extracted with dilute hydrochloric acid before being evaporated to dryness. There is thus obtained 5-{[p-(6-methoxy-2-phenyl-1,2,3,4-tetrahydro - 1 - naphthyl)phenoxy] methyl}-2-oxazolidinone.

Using the above procedure but replacing 1-[p-(3-amino-2-hydroxypropoxy)phenyl]-2-phenyl-6-methoxy - 1,2,3,4-tetrahydronaphthalene by 1-[p-(2,3-epoxy-1-methylpropoxy)phenyl]- and 1-[p-(4,5-epoxypentyloxy)phenyl]-2-phenyl-6-methoxy-1,2,3,4-tetrahydronaphthalene, there are obtained 5-{1-[p-6-methoxy-2-phenyl - 1,2,3,4-tetrahydro-1-naphthyl)phenoxy]ethyl}- and 5-{3-[p-(6-methoxy-2-phenyl-1,2,3,4-tetrahydro - 1 - naphthyl)phenoxy]propyl}-2-oxazolidinone, respectively.

EXAMPLE 11

*1-(p-methoxyphenyl)-2-phenyl-6-methoxy-1,2,3,4-tetrahydronaphthalene*

Using the procedure described in Example 6, but replacing 3-chloro-1,2-propanediol by methyl iodide and reducing the reaction time to 2 hours, there is obtained 1-(p-methoxyphenyl)-2-phenyl - 6 - methoxy-1,2,3,4-tetrahydronaphthalene.

EXAMPLE 12

*1-(p-tolyl)-2-phenyl-6-methoxy-1,2,3,4-tetrahydronaphthalene*

Using the procedure described in Example 1, but replacing 1,2-diphenyl-3,4-dihydronaphthalene by 1-(p-tolyl)-2-phenyl-6-methoxy-3,4-dihydronaphthalene, there is obtained 1-(p-tolyl)-2-phenyl-6-methoxy-1,2,3,4-tetrahydronaphthalene.

Similarly, using the procedure described in Example 1, but replacing 1,2-diphenyl-3,4-dihydronaphthalene by 1-(p-hydroxyphenyl)-2-phenyl-6-ethoxy-,
1-(p-hydroxyphenyl)-2-phenyl-6-pentyloxy-,
1-(p-hydroxyphenyl)-2-phenyl-6-hexyloxy-,
1-(p-hydroxyphenyl)-2-phenyl-6-isoöctyloxy-,
1-(p-hydroxyphenyl)-2-(2-bromophenyl)-6-methoxy-,
1-(p-hydroxyphenyl)-2-(3-chlorophenyl)-6-methoxy-,
1-(p-hydroxyphenyl)-2-(2-chloro-6-fluorophenyl)-6-methoxy-,
1-(p-hydroxyphenyl)-2-(2,3-dichlorophenyl)-6-methoxy-,
1-(p-hydroxyphenyl)-2-(p-tolyl)-6-methoxy-,
1-(p-hydroxyphenyl)-2-(2,6-dimethylphenyl)-6-methoxy-,
1,2-diphenyl-6-ethoxy-,
1,2-diphenyl-6-pentyloxy-,
1,2-diphenyl-6-hexyloxy-,
1,2-diphenyl-6-isoöctyloxy-,
1-phenyl-2-(2-bromophenyl)-6-methoxy-,
1-phenyl-2-(3-chlorophenyl)-6-methoxy-,
1-phenyl-2-(2-chloro-6-fluorophenyl)-6-methoxy-,
1-phenyl-2-(p-tolyl)-6-methoxy-,
1-phenyl-2-(2,6-dimethylphenyl)-6-methoxy-, and
1-(p-fluorophenyl)-2-phenyl-6-methoxy-3,4-dihydronaphthalenes, there are obtained the corresponding 1,2,3,4-tetrahydronaphthalenes.

The 1-(hydroxyphenyl)-1,2,3,4-tetrahydronaphthalenes so obtained are converted to the corresponding 1-(tertiary-aminoalkoxyphenyl)-, 1-(alkoxyphenyl)-, 1-(carbalkoxyalkoxyphenyl)-, 1-(carboxyalkoxyphenyl)-, 1-(epoxyalkoxyphenyl)-, 1 - [(2 - amino-1-hydroxyethyl)alkoxyphenyl]-, 1-{[5-2-oxoöxazolidinyl)]alkoxyphenyl}-, 1-{[5-(2-thioxoöxazolidinyl)]alkoxyphenyl}-, and 1 - (dihydroxyalkoxyphenyl)- derivatives thereof using the procedures set forth in Examples 3 through 11, above.

EXAMPLE 13

*1,2-diphenyl-6-methoxy-1,2,3,4,5,8-hexahydronaphthalene*

A solution of 0.31 g. of 1,2-diphenyl-6-methoxy-1,2,3,4-tetrahydronaphthalene in 10 ml. of tetrahydrofuran and 1 ml. of tert. butyl alcohol was added to 50 ml. of liquid ammonia redistilled from lithium. Lithium wire (0.07 g.) was added in 7 equal portions to the mixture at 5-minute intervals. The resulting mixture was stirred for 30 minutes before 3 ml. of tert. butyl alcohol was added. Following an additional 25 minutes stirring, there was added 0.3 g. of ammonium chloride. The solvent was evaporated from the mixture under a stream of nitrogen and the residue was treated with water. The solid was collected on a filter and recrystallized from ligroin to afford 1,2-diphenyl-6-methoxy-1,2,3,4,5,8-hexahydronaphthalene having a melting point of 132 to 134° C.

*Analysis.*—Calcd. for $C_{23}H_{24}O$: C, 87.30; H, 7.65. Found: C, 87.02; H, 7.90.

EXAMPLE 14

*1-(p-hydroxyphenyl)-2-phenyl-6-methoxy-1,2,3,4,5,8-hexahydronaphthalene*

Using the procedure described in Example 13, 0.66 g. of 1-(p-hydroxyphenyl)-2-phenyl - 6 - methoxy-1,2,3,4-tetrahydronaphthalene was reduced with 154 mg. of lithium. The reaction mixture was worked up as in Example 13 and the product was recrystallized from aqueous methanol. There was obtained 0.55 g. of 1-(p-hydroxyphenyl)-2-phenyl-6-methoxy - 1,2,3,4,5,8-hexahydronaphthalene having a melting point of 184.5 to 187.5° C.

An analytical sample prepared by further recrystallization from the same solvent melted at 183 to 185° C.

*Analysis.*—Calcd. for $C_{23}H_{24}O_2$: C, 83.10; H, 7.28. Found: C, 83.07; H, 7.40.

Using the procedure described in Example 13, but replacing 1,2 - diphenyl-6-methoxy-1,2,3,4-tetrahydronaphthalene by the appropriately substituted 1,2-diphenyl-6-alkoxy-1,2,3,4-tetrahydronaphthalene is productive of the corresponding 1,2,3,4,5,8-hexahydronaphthalene. Representative of the latter compounds so prepared are 1-(p-hydroxyphenyl)-2-phenyl-6-ethoxy-,
1-(p-hydroxyphenyl)-2-phenyl-6-pentyloxy-,
1-(p-hydroxyphenyl)-2-phenyl-6-hexyloxy-,
1-(p-hydroxyphenyl)-2-phenyl-6-isoöctyloxy-,
1-(p-hydroxyphenyl)-2-(2-bromophenyl)-6-methoxy-,
1-(p-hydroxyphenyl)-2-(3-chlorophenyl)-6-methoxy-,
1-(p-hydroxyphenyl)-2-(2-chloro-6-fluorophenyl)-6-methoxy-,
1-(p-hydroxyphenyl)-2-(2,3-dichlorophenyl)-6-methoxy-, 1-(p-hydroxyphenyl)-2-(p-tolyl)-6-methoxy-,
1-(p-hydroxyphenyl)-2-(2,6-dimethylphenyl)-6-methoxy-,
1,2-diphenyl-6-ethoxy-,
1,2-diphenyl-6-pentyloxy-,
1,2-diphenyl-6-hexyloxy-,
1,2-diphenyl-6-isoöctyloxy-,
1-phenyl-2-(2-bromophenyl)-6-methoxy-,
1-phenyl-2-(3-chlorophenyl)-6-methoxy-,
1-phenyl-2-(2-chloro-6-fluorophenyl)-6-methoxy-,
1-phenyl-2-(p-tolyl)-6-methoxy-,
1-phenyl-2-(2,6-dimethylphenyl)-6-methoxy-, and
1-(p-fluorophenyl)-2-phenyl-6-methoxy-1,2,3,4,5,8-hexahydronaphthalene.

The above compounds which contain a 1-(hydroxyphenyl) substituent can be etherified according to the procedures set forth in Examples 3 through 11 to produce the corresponding 1-(alkoxyphenyl)-, 1-(tertiaryaminoalkoxyphenyl)-, 1 - (carbalkoxyalkoxyphenyl)-, 1 - (carboxyalkoxyphenyl)-, 1 - (epoxyalkoxyphenyl)-, 1 - [(2-amino-1-hydroxyethyl)alkoxyphenyl]-, 1-{[5-(2 - oxoöxazolidinyl)]alkoxyphenyl}-, 1-{[5-(2-thioxoöxazolidinyl)]alkoxyphenyl}-, and 1-(dihydroxyalkoxyphenyl)- derivatives thereof.

EXAMPLE 15

*5,6-diphenyl-3,4,5,6,7,8-hexahydro-2(1H)-naphthalenone*

A suspension of 2.0 g. of 1,2-diphenyl-6-methoxy-1,2,3,4,5,8-hexahydronaphthalene in 400 ml. of methanol and 20 ml. of 2.5 N hydrochloric acid was stirred for 20 minutes in an ice bath and 1 hour at room temperature (about 25° C.). The now homogeneous solution was neutralized with saturated aqueous sodium bicarbonate solution and the bulk of the solvent was removed on a rotary evaporator. Ether was added to the residue and the organic layer was washed with water and saturated sodium chloride solution before being evaporated to dryness. The residual gum was recrystallized 3 times from a small amount of ligroin to give 0.82 g. of 5,6-diphenyl-3,4,5,6,7,8-hexahydro - 2(1H) - naphthalenone having a melting point of 124 to 129° C.

An analytical sample, melting point 128 to 132° C., was obtained by recrystallization from ligroin of the product from another run.

*Analysis.*—Calcd. for $C_{22}H_{22}O$: C, 87.37; H, 7.33. Found: C, 87.77; H, 7.42.

EXAMPLE 16

*5-(p-hydroxyphenyl)-6-phenyl-3,4,5,6,7,8-hexahydro-2(1H)-naphthalenone*

A suspension of 1.65 g. of 1-(p-hydroxyphenyl)-2-phenyl-6-methoxy - 1,2,3,4,5,8 - hexahydronaphthalene in 83 ml. of methanol containing 3.3 ml. of 1 M methanolic oxalic acid was stirred at room temperature (about 25° C.) until the material was all in solution (40 minutes). The solution was then taken to dryness at reduced pressure and the residue was dissolved in a mixture of ether and methylene chloride. This solution was washed in turn with water, aqueous sodium bicarbonate solution, and saturated sodium chloride solution. The residue which remained when the solvent was removed from the organic layer was recrystallized from methanol. There was obtained a first crop of 0.53 g. of 5-(p-hydroxyphenyl)-6-phenyl - 3,4,5,6,7 - hexahydro - 2(1H) - naphthalenone having a melting point of 209 to 216° C.; the second crop of material was recrystallized from aqueous methanol to give an additional 0.90 g. of the same compound having a melting point of 213 to 216° C.

The analytical sample, obtained by recrystallization of the first crop from methanol, melted at 215 to 224° C.

*Analysis.*—Calcd. for $C_{22}H_{22}O_2$: C, 82.98; H, 6.96. Found: C, 82.72; H, 7.28.

Using the procedure described in Example 15, but replacing 1,2-diphenyl-6-methoxy - 1,2,3,4,5,8-hexahydronaphthalene by the 1,2,3,4,5,8 - hexahydronaphthalenes disclosed immediately after Example 14, there are produced the following 3,4,5,6,7,8-hexahydro-2(1H)-naphthalenones:

5-(p-hydroxyphenyl)-6-phenyl-,
5-(p-hydroxyphenyl)-6-(2-bromophenyl)-,
5-(p-hydroxyphenyl)-6-(3-chlorophenyl)-,
5-(p-hydroxyphenyl)-6-(2-chloro-6-fluorophenyl)-,
5-(p-hydroxyphenyl)-6-(2,3-dichlorophenyl)-,
5-(p-hydroxyphenyl)-6-(p-tolyl)-,
5-(p-hydroxyphenyl)-6-(2,6-dimethylphenyl)-,
5,6-diphenyl-,
5-phenyl-6-(2-bromophenyl)-,
5-phenyl-6-(3-chlorophenyl)-,
5-phenyl-6-(2-chloro-6-fluorophenyl)-,
5-phenyl-6-(p-tolyl)-,
5-phenyl-6-(2,6-dimethylphenyl)-, and
5-(p-fluorophenyl) - 6 - phenyl - 3,4,5,6,7,8 - hexahydro-2(1H)-naphthalenone.

The above compounds which contain a 5-(hydroxyphenyl) substituent can be etherified according to the procedures set forth in Examples 3 through 11 to produce the corresponding 5-(alkoxyphenyl)-, 5-(tertiaryaminoalkoxyphenyl)-, 5 - carbalkoxyalkoxyphenyl)-, 5 - carboxyalkoxyphenyl)-, 5 - (epoxyalkoxyphenyl)-, 5 - [(2-amino - 1 - hydroxyethyl)alkoxyphenyl]-, 5 - {[5 - (2-oxoöxazolidinyl)]alkoxyphenyl}-, 5 - {[5 - (2 - thi-oxoöxazolidinyl)]alkoxyphenyl}-, and 5 - (dihydroxyalkoxyphenyl)- derivatives thereof.

EXAMPLE 17

*5,6-diphenyl-4,4a,5,6,7,8-hexahydro-2(3H)-naphthalenone*

A solution of 1 g. of 5,6-diphenyl-3,4,5,6,7,8-hexahydro-2(1H)-naphthalenone in 20 ml. of ethanol and 5 ml. of concentrated hydrochloric acid is heated under reflux for 5 hours. At the end of this time the reaction mixture is evaporated to dryness and the residue is dissolved in methylene chloride and chromatographed on a column of magnesium silicate (Florisil). The column is eluted with petroleum ether containing increasing proportions of acetone and those fractions which, on the basis of infrared spectral analysis are found to contain the desired material, are combined and evaporated to dryness. There is thus obtained 5,6-diphenyl-4,4a,5,6,7,8-hexahydro-2(3H)-naphthalenone.

Using the above procedure, but replacing 5,6-diphenyl-3,4,5,6,7,8-hexahydro-2(1H)-naphthalenone by 5 - (p-hydroxyphenyl)-6-phenyl-3,4,5,6,7,8 - hexahydro - 2(1H)-naphthalenone, there is obtained 5 - (p - hydroxyphenyl)-6-phenyl-4,4a,5,6,7,8-hexahydro-2(3H)-napthalenone.

Similarly, using the procedure of Example 17, but replacing 5,6-diphenyl-3,4,5,6,7,8 - hexahydro - 2(1H)-naphthalenone by the 3,4,5,6,7,8 - hexahydro - (1H)-naphthalenones disclosed immediately after Example 16, there are produced the corresponding 4,4a,5,6,7,8-hexahydro-2(3H)-naphthalenones as follows:

5-(p-hydroxyphenyl)-6-phenyl-,
5-(p-hydroxyphenyl)-6-(2-bromophenyl)-,
5-(p-hydroxyphenyl)-6-(3-chlorophenyl)-,
5-(p-hydroxyphenyl)-6-(2-chloro-6-fluorophenyl)-,
5-(p-hydroxyphenyl)-6-(2,3-dichlorophenyl)-,
5-(p-hydroxyphenyl)-6-(p-tolyl)-,
5-(p-hydroxyphenyl)-6-(2,6-dimethylphenyl)-,
5,6-diphenyl-,
5-phenyl-6-(2-bromophenyl)-,
5-phenyl-6-(3-chlorophenyl)-,
5-phenyl-6-(2-chloro-6-fluorophenyl)-,
5-phenyl-6-(p-tolyl),
5-phenyl-6-(2,6-dimethylphenyl)-, and
5-(p-fluorophenyl) - 6 - phenyl-4,4a,5,6,7,8 - hexahydro-2(3H)-naphthalenone.

The above compounds which contain a 5-(hydroxyphenyl) substituent can be etherified according to the procedures set forth in Examples 3 through 11 to produce the corresponding 5-(alkoxyphenyl)-, 5-(tertiary-aminoalkoxyphenyl)-, 5 - (carbalkoxyalkoxyphenyl)-, 5-(carboxyalkoxyphenyl)-,5-(epoxyalkoxyphenyl)-, 5 - [(2-amino - 1 - hydroxyethyl)alkoxyphenyl]-, 5 - {[5 - (2-oxoöxazolidinyl)]alkoxyphenyl}-, 5 - {[5 - (2 - thioxo-öxazolidinyl)]alkoxyphenyl}-, and 5 - (dihydroxyalkoxyphenyl)- derivatives thereof.

EXAMPLE 18

1-[p-(2-pyrrolidinoethoxy)phenyl] - 2-phenyl-6-methoxy-1,2,3,4,5,8-hexahydronaphthalene and the hydrochloride thereof Using the procedure described in Example 3, but replacing 1-(p-hydroxyphenyl)-2-phenyl-6-methoxy-1,2,3,4,tetrahydronaphthalene by 1-(p-hydroxyphenyl)-2-phenyl-6-methoxy-1,2,3,4,5,8-hexahydronaphthalene, there are obtained 1-[p-(2-pyrrolidinoethoxy)phenyl] - 2-phenyl-6-methoxy-1,2,3,4,5,8-hexahydronaphthalene and the hydrochloride thereof.

Similarly, using the procedure described in Example 3, but replacing 1-(p-hydroxyphenyl)-2-phenyl-6-methoxy-1,2,3,4-tetrahydronaphthalene by 5-(p-hydroxyphenyl)-6-phenyl-3,4,5,6,7,8-hexahydro-2(1H) - naphthalenone and 5-(p-hydroxyphenyl)-6-phenyl - 4,4a,5,6,7,8-hexahydro-2(3H)-naphthalenone, there are obtained 5-[p-(2-pyrrolidinoethoxy)phenyl]-6 - phenyl - 3,4,5,6,7,8-hexahydro-2(1H)-naphthalenone and 5-[p-(2-pyrrolidinoethoxy)phenyl]-6-phenyl-4,4a,5,6,7,8 - hexahydro - 2(3H)-naphthalenone, respectively, and the hydrochlorides thereof.

EXAMPLE 19

1-[p-(2-pyrrolidinoethoxy)phenyl]-2-phenyl-6-methoxy-1,2,3,4-tetrahydronaphthalene hydrobromide To a solution of 1 g. of 1-[p-(2-pyrrolidinoethoxy)phenyl]-2-phenyl-6-methoxy - 1,2,3,4 - tetrahydronaphthalene in 100 ml. of ether is added dropwise, with stirring, a slight excess of a 0.1 N ethereal solution of hydrogen bromide. The solid which separates is isolated by filtration, washed with ether, and dried. There is thus obtained 1-[p-(2-pyrrolidinoethoxy)phenyl] - 2-phenyl-6-methoxy-1,2,3,4-tetrahydronaphthalene hydrobromide.

In like manner, employing any of the free amino compounds set forth in Examples 3, 8, 12, 14, 16, 17 and 18 and the appropriate acid, there are obtained the corresponding acid addition salts. Illustratively, using the procedure analogous to those described above, the amines of Examples 3, 8, 12, 14, 16, 17 and 18 are converted to their acid addition salts with sulfuric, nitric, phosphoric, lactic, benzoic, methanesulfonic, p-toluenesulfonic, salicylic, acetic, propionic, malic, tartaric, citric, cyclohexanesulfamic, succinic, nicotinic, and ascorbic acids.

EXAMPLE 20

1-[p-(2-pyrrolidinoethoxy)phenyl]-2-phenyl-6-methoxy-1,2,3,4-tetrahydronaphthalene methiodide A solution of 1 g. of 1-[p-(2-pyrrolidinoethoxy)phenyl]-2-phenyl-6-methoxy-1,2,3,4,-tetrahydronaphthalene in 12 ml. of acetonitrile is cooled in ice. To the cooled solution is added 1.5 ml. of methyl iodide and the mixture is allowed to stand overnight before being poured into 100 ml. of ether. The solid which separates is isolated by filtration and recrystallized from a mixture of acetonitrile and ether. There is thus obtained 1-[p-2-pyrrolidinoethoxy)phenyl] - 2 - phenyl - 6 - methoxy-1,2-3,4-tetrahydronaphthalene methiodide in the form of a crystalline solid.

Similarly, using the above procedure, but replacing methyl iodide by ethyl bromide, propyl bromide, allyl bromide, and benzyl bromide, there are obtained the ethobromide, propyl bromide, allyl bromide, and benzyl bromide, respectively, of 1-[p-(2-pyrrolidinoethoxy)phenyl]-2-phenyl-6-methoxy-1,2,3,4-tetrahydronaphthalene.

Similarly, using the procedure described in Example 20, but replacing 1-[p-(2-pyrrolidinoethoxy)phenyl]-2-phenyl-6-methoxy-1,2,3,4-tetrahydronaphthalene by any of the tertiary bases prepared as described in Examples 3, 8, 12, 14, 16, 17 and 18, there are obtained the corresponding methiodides and like quaternary ammonium salts.

EXAMPLE 21

1-[p-(2-pyrrolidinoethoxy)phenyl]-2-phenyl-6-methoxy-1,2,3,4-tetrahydronaphthalene methochloride A solution of 1 g. of 1-[p-(2-pyrrolidinoethoxy)phenyl]-2-phenyl-6-methoxy - 1,2,3,4 - tetrahydronaphthalene methiodide in dimethylformamide is shaken with a suspension of silver oxide until the precipitation of silver oxide is complete. The resulting mixture is filtered and the filtrate containing the corresponding quaternary ammonium hydroxide is neutralized by the addition of aqueous hydrochloric acid. The resulting mixture is evaporated to dryness to obtain 1-[p-(2-pyrrolidinoethoxy)phenyl]-2-phenyl-6 - methoxy-1,2,3,4-tetrahydronaphthalene methochloride.

Similarly, using the above procedure, but replacing hydrochloric acid by other acids such as sulfuric acid, hydrobromic acid, phosphoric acid, acetic acid, methanesulfonic acid, and the like, there are obtained the corresponding quaternary ammonium salts.

In like manner, using the above procedure, the anion of any of the quaternary ammonium salts of the invention can be exchanged by any other desired anion by forming the corresponding quaternary ammonuim hydroxide and reacting the latter with the appropriate acid.

I claim:

1. A compound having the formula

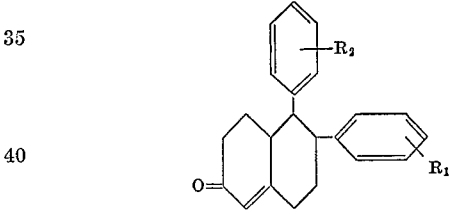

wherein $R_1$ is selected from the class consisting of hydrogen, lower-alkyl of from 1 to 8 carbon atoms, inclusive, and halogen; and $R_2$ is the radical

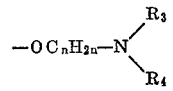

wherein —$C_nH_{2n}$ is alkylene from 2 to 6 carbon atoms, inclusive and $R_3$ and $R_4$ taken individually represent lower-alkyl, and $R_3$ and $R_4$ when taken together with the attached nitrogen atom represent the residue of a saturated heterocyclic radical of from 5 to 7 ring atoms, inclusive.

2. A compound having the formula

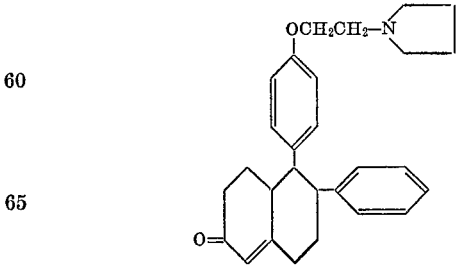

No references cited.

ALEX MAZEL, Primary Examiner
JOSE TOVAR, Assistant Examiner

U.S. Cl. X.R.
260—239, 247.1, 247.2, 247.7, 268, 294, 294.7 295.5 326.3; 424—248, 264, 267, 274